(12) United States Patent
Kim et al.

(10) Patent No.: US 11,320,158 B2
(45) Date of Patent: May 3, 2022

(54) MULTIFUNCTIONAL CIRCULATION SYSTEM ENABLING PURIFICATION OF OUTSIDE AIR

(71) Applicant: Coway Co., Ltd., Chungcheongnam-do (KR)

(72) Inventors: Dong Wook Kim, Seoul (KR); Chan Jung Park, Seoul (KR); Sun Dug Kwon, Seoul (KR); Byung Soo Yun, Seoul (KR); Dong Hun Lee, Seoul (KR); In Kyu Back, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 209 days.

(21) Appl. No.: 16/609,139

(22) PCT Filed: May 11, 2018

(86) PCT No.: PCT/KR2018/005460
§ 371 (c)(1),
(2) Date: Oct. 28, 2019

(87) PCT Pub. No.: WO2018/208129
PCT Pub. Date: Nov. 15, 2018

(65) Prior Publication Data
US 2020/0096210 A1  Mar. 26, 2020

(30) Foreign Application Priority Data

May 11, 2017 (KR) .......................... 10-2017-0058685
May 8, 2018 (KR) .......................... 10-2018-0052670

(51) Int. Cl.
*F24F 8/10* (2021.01)
*F24F 13/28* (2006.01)
(Continued)

(52) U.S. Cl.
CPC ................ *F24F 8/10* (2021.01); *F24F 13/28* (2013.01); *D06F 71/34* (2013.01); *D06F 73/00* (2013.01);
(Continued)

(58) Field of Classification Search
CPC .... F24F 8/10; F24F 13/28; F24F 8/117; F24F 3/14; F24F 6/04; F24F 13/20;
(Continued)

(56) References Cited

U.S. PATENT DOCUMENTS 1,602,315 A * 10/1926 Wood ...................... D06F 58/10
34/164
3,865,545 A * 2/1975 Forg ........................ D06M 11/05
8/116.4
(Continued)

FOREIGN PATENT DOCUMENTS

| JP | 3321945 | 9/2002 |
|---|---|---|
| KR | 1996-0033354 | 8/1996 |

(Continued)

OTHER PUBLICATIONS

EPO translation of WO 2016/086848 (Year: 2016).*

*Primary Examiner* — Stephen Hobson
(74) *Attorney, Agent, or Firm* — Fay Kaplun & Marcin, LLP

(57) ABSTRACT

A multifunctional storage system includes a storage chamber and a machinery chamber provided on a side of the storage chamber. The system further includes a dehumidification part dehumidifying circulating air flowing in the storage chamber; a circulating air inlet and a circulating air outlet enabling the storage chamber and the machinery chamber to communicate; and a circulation filter unit supplying moisture to circulating air supplied to the storage chamber via the circulating air inlet.

20 Claims, 7 Drawing Sheets

(51) Int. Cl.

| | | |
|---|---|---|
| *F24F 3/14* | (2006.01) | |
| *F24F 6/04* | (2006.01) | |
| *F24F 13/20* | (2006.01) | |
| *F24F 6/00* | (2006.01) | |
| *F24F 8/117* | (2021.01) | |
| *D06F 73/02* | (2006.01) | |
| *D06F 71/34* | (2006.01) | |
| *D06F 73/00* | (2006.01) | |

(52) U.S. Cl.
CPC ............... *D06F 73/02* (2013.01); *F24F 3/14* (2013.01); *F24F 6/04* (2013.01); *F24F 8/117* (2021.01); *F24F 13/20* (2013.01); *F24F 2006/008* (2013.01); *F24F 2013/205* (2013.01)

(58) Field of Classification Search
CPC .......... F24F 2006/008; F24F 2013/205; D06F 73/02; D06F 71/34; D06F 73/00; D06F 35/00; Y02A 50/20; A47B 67/00; B01D 46/00; B01D 46/42; B01D 46/0002
See application file for complete search history.

(56) References Cited

U.S. PATENT DOCUMENTS

| | | | | |
|---|---|---|---|---|
| 4,032,294 | A * | 6/1977 | Thompson | D06B 3/30 8/116.4 |
| 5,600,975 | A * | 2/1997 | McClain | D06B 1/02 68/5 C |
| 5,815,961 | A * | 10/1998 | Estes | D06F 73/02 38/14 |
| 6,189,346 | B1 * | 2/2001 | Chen | D06F 73/02 68/5 R |
| 8,539,694 | B2 * | 9/2013 | Moon | D06F 58/20 34/606 |
| 8,695,228 | B2 * | 4/2014 | Lee | D06F 73/02 34/86 |
| 10,041,203 | B2 * | 8/2018 | Ahn | F25B 27/02 |
| 2008/0148493 | A1 * | 6/2008 | Hong | D06F 73/02 8/149.3 |
| 2009/0119955 | A1 * | 5/2009 | Hong | D06F 58/10 38/14 |
| 2010/0132130 | A1 * | 6/2010 | Moon | D06F 58/10 8/137 |
| 2010/0146805 | A1 * | 6/2010 | Kim | D06F 58/20 34/201 |
| 2011/0296703 | A1 * | 12/2011 | Kim | D06F 73/02 34/89 |
| 2014/0197882 | A1 * | 7/2014 | Prabhakar, III | H01L 24/00 327/537 |
| 2015/0000353 | A1 * | 1/2015 | Wang | D06F 17/12 68/5 C |
| 2015/0159315 | A1 * | 6/2015 | Lim | D06F 71/36 38/3 |
| 2015/0219346 | A1 * | 8/2015 | Morikawa | F24F 1/0063 261/136 |
| 2016/0273153 | A1 * | 9/2016 | Nam | D06F 58/203 |
| 2017/0342651 | A1 * | 11/2017 | Choi | D06F 73/02 |
| 2018/0283803 | A1 * | 10/2018 | Koh | F28D 9/0062 |
| 2020/0385916 | A1 * | 12/2020 | Kim | D06F 73/02 |
| 2021/0080129 | A1 * | 3/2021 | McArdle | F24F 6/043 |

FOREIGN PATENT DOCUMENTS

| | | | |
|---|---|---|---|
| KR | 10-0672490 | 1/2007 | |
| KR | 10-0672491 | 1/2007 | |
| KR | 10-0782377 | 12/2007 | |
| KR | 2008-0105499 | 12/2008 | |
| KR | 2009-0102401 | 9/2009 | |
| KR | 10-1083106 | 11/2011 | |
| KR | 10-1443316 | 9/2014 | |
| KR | 10-1498035 | 3/2015 | |
| WO | WO-2016086848 A1 * | 6/2016 | ............ D06F 58/10 |

\* cited by examiner

MULTIFUNCTIONAL CIRCULATION SYSTEM ENABLING PURIFICATION OF OUTSIDE AIR

TECHNICAL FIELD

The present invention relates to a multifunctional circulation system capable of purifying outside air, and more particularly, to a technology of a multifunctional circulation system capable of circulating air inside the multifunctional circulation system or purifying air in a space where the multifunctional circulation system is located by controlling opening and closing operations of each of inlet and exhaust ports communicating with the outside air, and a circulating air inlet and a circulating air outlet enabling a storage chamber and a machinery chamber to communicate with each other.

BACKGROUND ART

In wardrobes, cabinets, or clothing management devices, which are kinds of cabinets for storing clothes, beddings, and other household articles, steam is used to remove contaminants and odorous substances such as dust sticking to the articles during the use of the articles by a user, and to improve wrinkles.

When the steam is directly sprayed to the articles such as clothing inside the cabinet, water molecules of the steam are evaporated together with contaminants or odorous substances, thereby removing the contaminants or odorous substances and simultaneously improving the wrinkles.

The "steam" is sprayed in the form of gas when hot water of about 100 degrees is exhausted through a high-pressure nozzle. When the steam is sprayed at the room temperature, the steam may be visible like a hazy smoke.

However, it is reported that a problem may occur because the steam causes damage to the clothing. For example, if hot steam or hot/high pressure steam is directly sprayed onto the clothing which is made of sensitive materials, damage to the materials may occur. In another example, water molecules generated by the steam are sprayed at the room temperature and then condensed while forming water droplets. In this case, if dehumidification is not carried out effectively, the water droplets may remain on the clothing. If this state lasts for a long time, damage to the clothing, which is made of sensitive materials, may occur.

Further, when the steam is directly sprayed onto a plastic part or the like included in the clothing, a fatal problem may occur because environmental hormones which are very harmful to a human body are generated.

Meanwhile, as air pollution by fine dust and the like becomes serious, devices related to air purification, such as air purifier, have been recently spotlighted. Accordingly, in recent years, there is a very high need for a technology capable of cleaning the clothing and the like stored in the storage chamber while purifying outside air.

(Patent Document 1) Granted Korean Patent No. 10-0672490

(Patent Document 2) Granted Korean Patent No. 10-0672491

(Patent Document 3) Granted Korean Patent No. 10-1443316

(Patent Document 4) Granted Korean Patent No. 10-1498035

(Patent Document 5) Granted Korean Patent No. 10-1083106

SUMMARY

The present invention relates to a mutlifunctional circulation system enabling purification of outside air.

Specifically, the present invention suggests a structure of a multifunctional storage system, which is capable of increasing the amount of moisture contained in air circulating through a machinery chamber.

In addition, the present invention suggests a structure and a method for preheating a multifunctional storage system to increase a load applied to an evaporator and a condenser and efficiency in a drying or humidifying mode of the multifunctional storage system by increasing the amount of moisture contained in circulating air.

In accordance with an aspect of the present invention, there is provided a multifunctional storage system including: a storage chamber (100); a machinery chamber (200) provided at one side of the storage chamber (100); a dehumidification part (260) configured to dehumidify circulating air flowing in the storage chamber (100); a circulating air inlet (141) and a circulating air outlet (142) configured to allow the storage chamber (100) and the machinery chamber (200) to communicate with each other; and a circulation filter unit (229) configured to supply moisture to the circulating air supplied to the storage chamber (100) via the circulating air inlet (141).

The storage chamber (100) may be heated by the dehumidification part (260).

The machinery chamber (200) may further include: an intake port (210) and an exhaust port (250) configured to allow outside air to communicate with the machinery chamber (200); and a purification filter unit (219) configured to filter the outside air introduced through the intake port (210).

The multifunctional storage system may further include: a first flow path switching member (241) configured to open or close the circulating air inlet (141); and a second flow path switching member (242) configured to open or close the circulating air outlet (142).

The machinery chamber (200) may further include: a fan unit (230) configured to circulate air in one direction; a first flow path (220) configured to allow the intake port (210) and the fan unit (230) to communicate with each other; and a second flow path (240) configured to communicate with each of the exhaust port (250), the fan unit (230), the first flow path (220), and the storage chamber (100).

The first and second flow path switching members (241 and 242) may allow the second flow path (240) to selectively communicate with the exhaust port (250) or the storage chamber (100).

The machinery chamber (200) may further include: a supply water tank (270);

and a condensate water tank (280), and the circulation filter unit (229) may be provided on the first flow path (220), the circulation filter unit (229) may receive moisture from the supply water tank (270), and condensate water generated from the circulating air of the storage chamber (100) and the machinery chamber (200) may be stored in the condensate water tank (280).

The second flow path (240) may be located above the fan unit (230) and the first flow path (220).

The circulating air inlet (141) and the circulating air outlet (142) may be located between the second flow path (240) and the storage chamber (100), the circulating air inlet (141) may be configured to communicate with the fan unit (230)

such that air is exhausted from the machinery chamber (200) toward the storage chamber (100), and the circulating air outlet (142) may be configured to circulate air from the storage chamber (100) toward the machinery chamber (200).

A portion in communication with the circulating air inlet (141) in the storage chamber (100) may be inclined upward, so that the air introduced from the circulating air inlet (141) is exhausted into the storage chamber (100) while forming a predetermined angle from a bottom surface of an inside of the storage chamber (100).

The multifunctional storage system may further include: a door (600) configured to cover front surfaces of the machinery chamber (200) and the storage chamber (100) except for the intake port (210), wherein the door (600) may include: a controller (610); and an exhaust door (650) configured to open and close the exhaust port (250), and the exhaust door (650) may be opened in an air purifying mode and closed in a clothing management mode.

A recirculation module (300) including a recirculation fan may be provided at an upper end of the storage chamber (100), and the recirculation module (300) may exhaust air toward a lower portion of an inside of the storage chamber (100).

In a clothing management mode where the dehumidification part (260) operates, natural humidifying air generated by the circulation filter unit (229) may be supplied to the storage chamber (100) and circulated therein in a state in which the machinery chamber (200) is blocked from the outside air and communicates with the storage chamber (100).

In the clothing management mode, the circulating air inlet (141) and the circulating air outlet (142) may be opened, and the intake port (210) and the exhaust port (250) may be closed.

The natural humidifying air may be supplied to the storage chamber (100) by the fan unit (230) and circulated therein.

In the clothing management mode, air that flows by the fan unit (230) may circulate through the machinery chamber (200) and the storage chamber (100) while sequentially flowing through the second flow path (240), the circulating air inlet (141), the storage chamber (100), the circulating air outlet (142), the second flow path (240), the first flow path (220) and the fan unit (230).

In an air purifying mode for filtering the outside air, the machinery chamber (200) may be blocked from the storage chamber (100) and communicate with the outside air so that air filtered by the purification filter unit (219) is exhausted to an outside.

In the air purifying mode, the circulating air inlet (141) and the circulating air outlet (142) may be closed, and the intake port (210) and the exhaust port (250) may be opened.

In the air purifying mode, the air introduced through the intake port (210) may sequentially flow through the purification filter unit (219), the first flow path (220), the fan unit (230), the second flow path (240) and the exhaust port (250).

The multifunctional storage system may further include operation modes of: a full circulation mode in which the machinery chamber (200) communicates with both the outside air and the storage chamber (100); and a full blocking mode in which the machinery chamber (200) is blocked from both the outside air and the storage chamber (100).

In the clothing management mode, warm air may be generated by heat generated from the fan unit (230) and the dehumidification part (260) and may be exhausted to the storage chamber (100).

In the clothing management mode, the natural humidifying air may be primarily exhausted to the storage chamber (100) and the warm air may be exhausted to the storage chamber (100) after the exhaust of the natural humidifying air is stopped.

According to the present invention, it is possible to remove contaminants or odorous substances without using steam and to improve wrinkles. Since the steam is not used, damage to the clothing or the like and generation of environmental hormones can be basically prevented.

In addition, the phenomenon, in which condensate water is excessively generated due to the use of the steam, can be suppressed so that a user does not need to frequently discard a condensate storage unit, improving the convenience of use. Further, since the steam is not used, noise generated when the steam is generated can be diminished and power consumption can be reduced.

In addition, according to the present invention, a hybrid multifunctional storage system capable of managing the clothing and purifying the air can be provided, in which contaminants and odorous substances in the storage chamber can be effectively removed without being exhausted to the outside in the clothing management mode, and the outside air is purified in the air purifying mode similarly to a general air purifier.

To this end, the present invention has a simple structure in which the exhaust port or the storage chamber can be selectively communicated by providing first and second flow path switching members, such that it is easy to change the operation mode between the clothing management mode and the air purifying mode.

In addition, according to the present invention, the air flows through the circulation filter unit in the clothing management mode, and flows through the purifying filter unit in the air purifying mode, thereby maximizing the efficiency of each mode.

DETAILED DESCRIPTION

Figure 1:
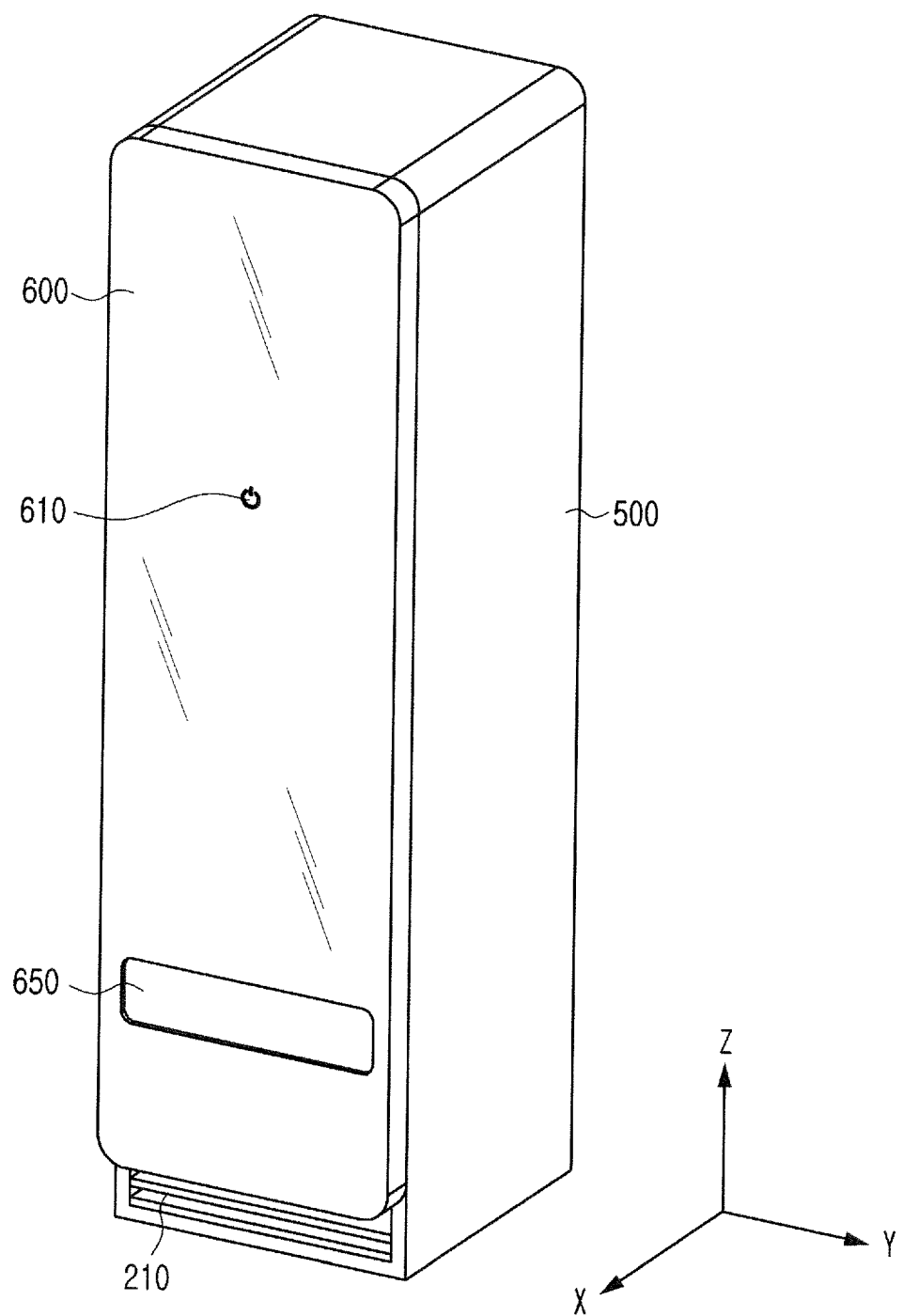
FIG. 1 is a perspective view showing an external appearance of a multifunctional storage system according to the present invention.
Figure 2:
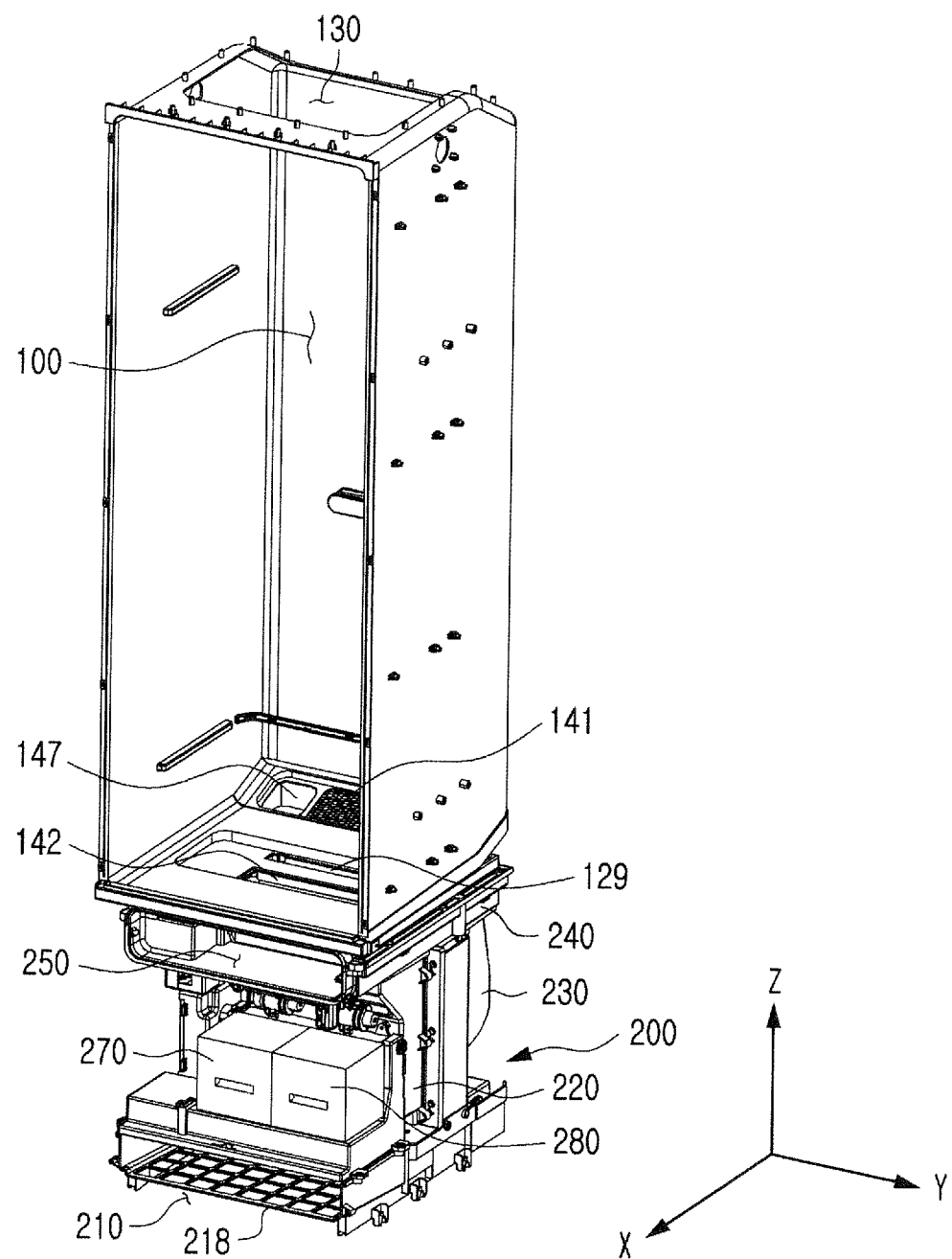
FIG. 2 is a perspective view showing an inside of a multifunctional storage system according to the present invention, in which a casing, a door and a recirculation module are omitted for explanation.
Figure 3:
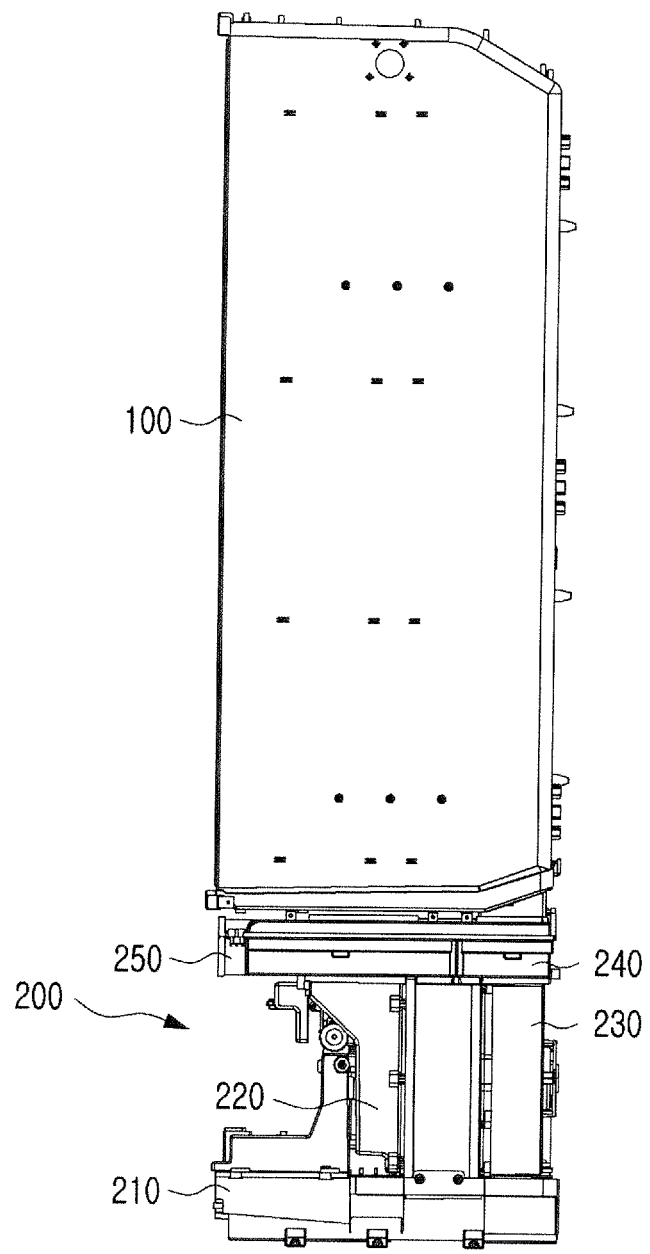
FIG. 3 is a right side view showing an inside of a multifunctional storage system according to the invention.
Figure 4:
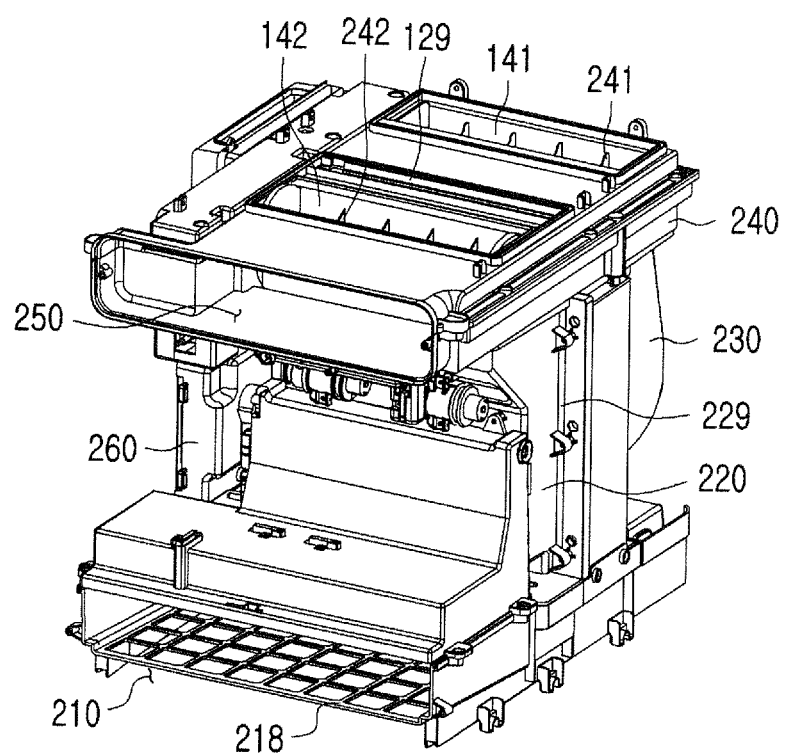
FIG. 4 is a perspective view showing an inside of a machinery chamber of a multifunctional storage system according to the present invention.

Hereinafter, the multifunctional storage system according to the present invention will be described with reference to the drawings.

For the purpose of explanation, terms such as front (X axis), rear (-X axis), right (Y axis), left (-Y axis), upward (Z axis), and downward (-Z axis) are used. Although a coordinate system is shown in the drawing, this is for illustrative purposes only and the present invention is not limited to those directions.

Description of the Structure of the Multifunctional Storing System

The multifunctional storage system according to the present invention will be described with reference to FIGS. 1 to 5.

The multifunctional storage system according to the present invention may include a storage chamber 100, a machinery chamber 200, a recirculation module 300, a casing 500, and a door 600.

The storage chamber 100 is a space in which clothing and the like are stored and contaminants and odorous substances are removed therefrom. To this end, the inside of the storage chamber 100 may rise to a high temperature and natural humidifying air may be introduced into the storage chamber 100 and circulated therein as circulating air. Details thereof will be described below with reference to the operation mode.

At a lower surface of an inside of the storage chamber 100, there are located a circulation filter mounting part 129, a circulating air inlet 141, a circulating air outlet 142 and a functional material storage part 147.

The circulation filter mounting part 129 may be an opening configured to easily attach or detach a circulation filter unit 229 for repair or replacement of the circulation filter unit 229 located in the machinery chamber 200. The circulating air inlet 141 and the circulating air outlet 142 may be openings through which the circulating air inside the storage chamber 100 flows in and out of the machinery chamber 200.

The circulating air inlet 141 may communicate with a fan unit 230 and may be configured to exhaust air from the machinery chamber 200 toward the storage chamber 100, and the circulating air outlet 142 may be configured such that the air circulates from the storage chamber 100 to the machinery chamber 200.

In addition, a portion in communication with the circulating air inlet 141 in the storage chamber 100 may be inclined upward, such that the air introduced from the circulating air inlet 141 may be exhausted to the inside of the storage chamber 100 while forming a predetermined angle from a bottom surface of the inside of the storage chamber 100, Accordingly, the circulating air exhausted from the circulating air inlet 141 may come into contact with the clothing or the like stored in the storage chamber 100 in a larger area than when the circulating air is exhausted in a vertical direction, thereby improving the cleaning efficiency.

The functional material storage part 147 may be a space for storing materials having a function other than a function of removing the contaminants or odorous substances of articles such as clothing and the like stored in the storage chamber 100. For example, a fragrant material may be stored in the functional material storage part 147 to exhaust fragrance to the storage chamber 100. In addition, the functional material may be periodically filled by a user.

A recirculation module mounting part 130 on which the recirculation module 300 is mounted may be located at an inner upper portion of the storage chamber 100. The recirculation module 300 may be provided with an air shot hanger (not shown) having an air shot function.

Alternatively, a hanger (not shown) may be located at the center of the inner upper portion of the storage chamber 100, and a trousers hanger (not shown) may be further located at left and right inner side walls.

The machinery chamber 200 may be a space for performing the air purifying mode and for circulating the air in the air purifying mode by receiving the air from the storage chamber 100, filtering the air, and exhausting the natural humidifying air as circulating air.

The machinery chamber 200 may be located in any direction with respect to the storage chamber 100, but is preferably located below the storage chamber 100. In this case, condensate water or saturated humid air condensed in the storage chamber 100 may be introduced into the machinery chamber 200 due to the weight thereof and exhausted to the outside through the condensate water tank 280.

The machinery chamber 200 may include an intake port 210, a first flow path 220, a fan unit 230, a second flow path 240, an exhaust port 250, a dehumidification part 260, a supply water tank 270, and a condensate water tank 280.

The intake port 210 may be a portion that sucks the outside air into the machinery chamber 200. The intake port 210 may be selectively opened or closed. For example, the intake pot 210 may be opened in the air purifying mode and closed in the clothing management mode. The intake port 210 may be preferably located below the exhaust port 250 described below, and more preferably located at the lowest end of the machinery chamber 200. In this case, since the intake port 210 is closed in the clothing management mode, the circulating flow path of the circulating air can be more simplified, and it is preferable when the door 600 does not reach the intake port 210.

A purification filter unit mounting part 218 may be positioned at the intake port 210, and a purification filter unit 219 may be located in the purification filter unit mounting part 218. The purification filter unit 219 may function to filter the outside air introduced in the air purifying mode, and may include a pre-filter, a hepa filter, and the like, but is not limited thereto.

The first flow path 220 may communicate with the intake port 210, the second flow path 230, and the fan unit 230. The outside air, which is introduced through the intake port 210 and filtered in the air purifying mode, and the circulating air, which is introduced through the second flow path 230 in the clothing management mode, may flow into the first flow path 220.

The circulation filter unit 229 is positioned inside the first flow path 220. The circulation filter unit 229 may function to filter the circulating air. The circulation filter unit 229 may include a humidification filter, and therefore, when water stored in the supply water tank 270 is supplied to the humidification filter, moisture is supplied to the circulating air passing through the humidification filter so that natural humidifying air is generated. The user may detach or attach the circulation filter unit 229 by opening the door 600 and accessing the circulation filter mounting part 129.

According to another embodiment of the present invention, heat may be applied to the humidification filter provided in the circulation filter unit 229 or to a tubing connecting the supply water tank 270 to the humidification filter, such that the temperature of the natural humidifying air may rise to a certain level and the natural humidifying air having the temperature of certain level may be supplied to the storage chamber 100. A separate heating member (not shown) may be used to apply heat, and heat generated by the dehumidification part 260 to be described below in the dehumidification process may be used.

An inlet side of the fan unit 230 may communicate with the first flow path 220 to impart power to introduce the air into the first flow path 220. The outside air may be introduced into the first flow path 220 in the air purifying mode by the operation of the fan unit 230, and air inside the storage chamber 100 is introduced into the first flow path 220 as the circulating air in the clothing management mode. An outlet side of the fan unit 230 may communicate with the second flow path 240. In addition, since the exhaust port 250 is positioned above the intake port 210 and the storage chamber 100 is positioned above the machinery chamber 200, the second flow path that can communicate with the exhaust port 250 may be positioned above the fan unit 230 and the first flow path 220.

The second flow path 240 may receive filtered outside air or circulating air from the fan unit 230. The second flow path 240 may selectively communicate with any one of the storage chamber 100 and the exhaust port 250, and may include a first flow path switching member 241 and a second flow path switching member 242 to control the storage chamber 100 and the exhaust port 250. The first flow path switching member 241 and the second flow path switching member 242 may operate in association with each other to switch the flow path. In one embodiment, the first flow path switching member 241 and the second flow path switching member 242 may be members that rotate about an axis, but any mechanism for selectively switching the flow path may be adopted.

Figure 5:
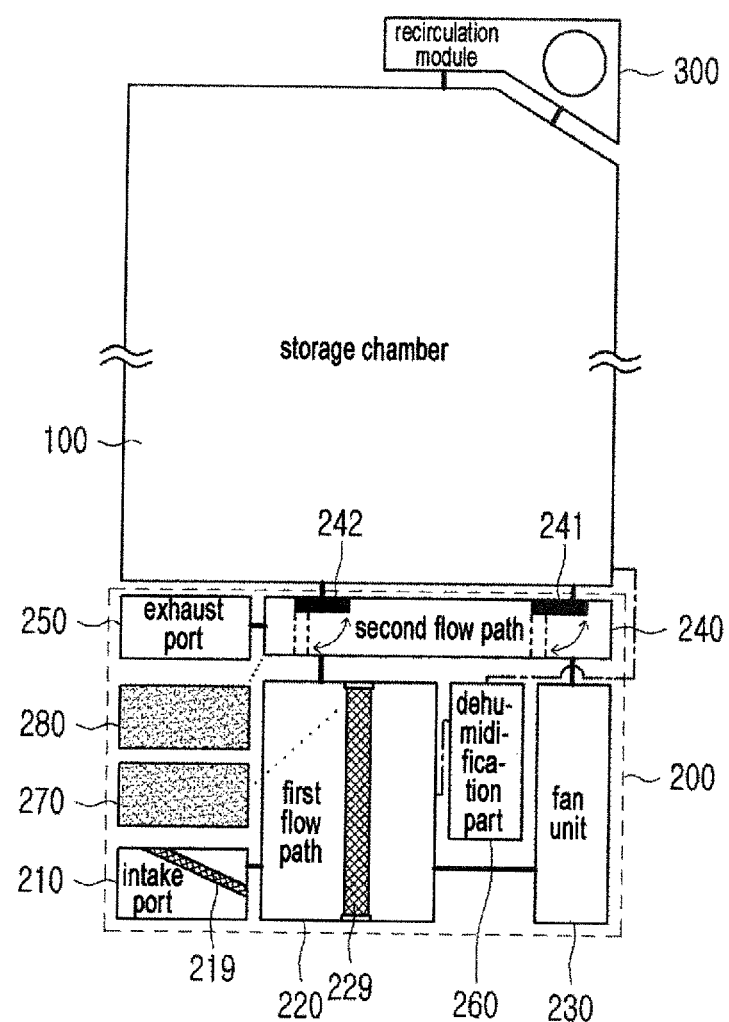
FIG. 5 is a schematic diagram for explaining an operation mode of a multifunctional storage system according to the present invention.
Figure 6:
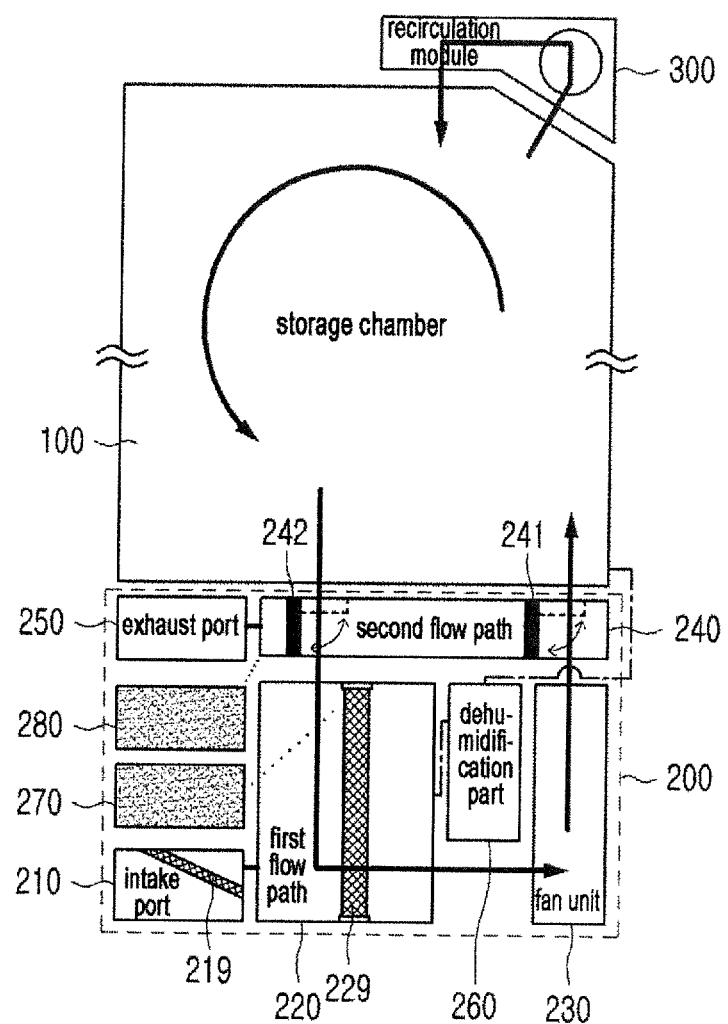
FIG. 6 is a schematic diagram for explaining a clothing management mode of a multifunctional storage system according to the present invention.

The first flow path switching member 241 and the second flow path switching member 242 may allow the second flow path 240 to be blocked from the storage chamber 100 and communicate with the exhaust port 250 in the air purifying mode (see FIGS. 5 and 7) and may allow the second flow path 240 to communicate with the storage chamber 100 and to be blocked from the exhaust port 250 in the clothing management mode (see FIG. 6). That is, in the clothing management mode, the circulating air of the second flow path 240 may be introduced into the storage chamber 100 through the circulating air inlet 141 located above the first flow path switching member 241, and the circulating air inside the storage chamber 100 may be exhausted to the second flow path 240 through the circulating air outlet 142 located above the second flow path switching member 242 so that the air can be circulated. Details thereof will be described below in the operation modes.

The exhaust port 250 may receive the filtered outside air from the second flow path 240 and exhausts the filtered outside air to the outside. An exhaust door 650 may be positioned outside the door 600 corresponding to the exhaust port 250 to open or close the exhaust port 250. For example, the exhaust door 650 may be opened in the air purifying mode to exhaust the filtered outside air from the exhaust port 250, and the exhaust door 650 may be closed in the clothing management mode.

The dehumidification part 260 may perform a function of dehumidifying the circulating air flowing through the storage chamber 100. Dehumidification may be required to finely keep the inside of the storage chamber 100 and the circulating air and to prevent recontamination. The circulating air in the storage chamber 100 may be dehumidified, or the circulating air flowing from the storage chamber 100 to the machinery chamber 200 may be dehumidified. The dehumidification part 260 may be, for example, a heat pump, but is not limited thereto. Heat may be generated while the dehumidification part 260 performs the dehumidification operation. The heat is not discarded and may be used in the clothing management mode (indicated by a dashed line in FIGS. 5 to 7). For example, after the storage chamber 100 is heated to about 50 to 70 degrees by using the heat generated during the dehumidification process by the dehumidification part 260, the circulating air having the room temperature may be received from the second air flow path 240 through the circulating air inlet 141 to remove contaminants or odorous substances from the clothing or the like. According to another example, as described above, the heat generated during the dehumidification process by the dehumidification part 260 may be supplied to the humidification filter of the circulation filter unit 229 or to the tubing connecting the supply water tank 270 and the humidification filter in order to heat the natural humidifying air which functions as a circulating air. The above-described temperature is an example only, and the present invention is not limited thereto and may be variously changed. In addition, only one of the dehumidification part 260 and the circulation filter unit 229 (that is, the humidification filter) may be selectively operated so as not to interfere with each other.

According to another embodiment of the present invention, in the clothing management mode, the heat generated from the fan unit 230 or generated during the dehumidification process of the dehumidification part 260 may be used or warm air generated by a separate heating member (not shown) may be exhausted into the storage chamber 100. The circulating air may be converted into a natural humidifying air by receiving moisture from the circulation filter unit 229, which will be described below, and the natural humidifying air is combined with the warm air supplied from the fan unit 230 to remove contaminants and odorous substances from the stored clothing. To this end, the dehumidification part 260 or the separate heating member (not shown) may be positioned adjacent to the circulating air inlet 141. In addition, the user may control the amount of natural humidifying air and the amount of warm air, and the control method optimized according to the type and material of the clothing to be stored may be provided as a separate mode.

Meanwhile, according to another embodiment of the present invention, a full circulation mode in which the machinery chamber 200 communicates with both the outside air and the storage chamber 100, and a full blocking mode in which the machinery chamber 200 is blocked from both the outside air and the storage chamber 100 may be further provided, which will be described below.

The supply water tank 270 may store water to be supplied to the humidification filter provided in the circulation filter unit 229. To this end, the supply water tank 270 may be connected to the circulation filter unit 229 through the tubing. The condensate water tank 280 may collect and store the condensate water generated in the storage chamber 100, or may collect and store the condensate water which is generated as the saturated humid air generated in the storage chamber 100 is condensed while flowing through the first flow path 220 or the second flow path 240 of the machinery chamber 200. To this end, the condensate water tank 280 may be connected to the storage chamber 100 and/or the first flow path 220 and/or the second flow path 220 through the tubing.

In order to fill the water or discard the filled condensate water, it is desirable for a user to easily access both the supply water tank 270 and the condensate water tank 280. To this end, the supply water tank 270 and the condensate water tank 280 may be preferably located at the front surface of the machinery chamber 200 so that the user can easily attach or detach the supply water tank 270 and the condensate water tank 280 by opening the door 600 and manipulating a handle located in each water tank located below the exhaust port 250.

The recirculation module 300 may assist the recirculation of the circulating air of the storage chamber 100 in the air purifying mode, and may perform a function of assisting the direct drying of clothing and the like. In addition, the recirculation module 300 may operate independently from the operation of the machinery chamber 200 such that the recirculation module 300 may operate as a dust brush for the clothing stored in the storage chamber 100.

The casing 500 may form the external appearance of the multifunctional storage system.

The door 600 may form a front surface of the multifunctional storage system, and a user may access the inside of the storage chamber 100 by opening the door 600.

When the user opens the door 600, the inside of the storage chamber 100 may be exposed in the storage chamber 100, and the exhaust port 250, the supply water tank 270, and the condensate water tank 280 are exposed in the machinery chamber 200. However, the door 600 does not cover the intake port 210. The lowest end of the door 600 may be located above the intake port 210. This is to purify the air even when the door 600 is not opened in the air purifying mode.

A controller 610 and the exhaust door 650 may be located on the outer surface of the door 600. The controller 610 may include an input unit for selecting an operation mode and an output unit for outputting a current operation state. The exhaust door 650 may communicate with the exhaust port 250 of the machinery chamber 200. Thus, the exhaust door 650 is opened even when the door 600 is not opened in the air purifying mode so that the filtered outside air may be exhausted.

The door 600 is preferably formed of a half-mirror. In this case, the clothing located inside the storage chamber 100 may be shown to the user, if necessary, and the door 600 may serve as a mirror in order to provide convenience to the user who takes out the clothing and the like from the storage chamber 100.

Description of the Operation Modes of the Multifunctional Storage System

Figure 7:
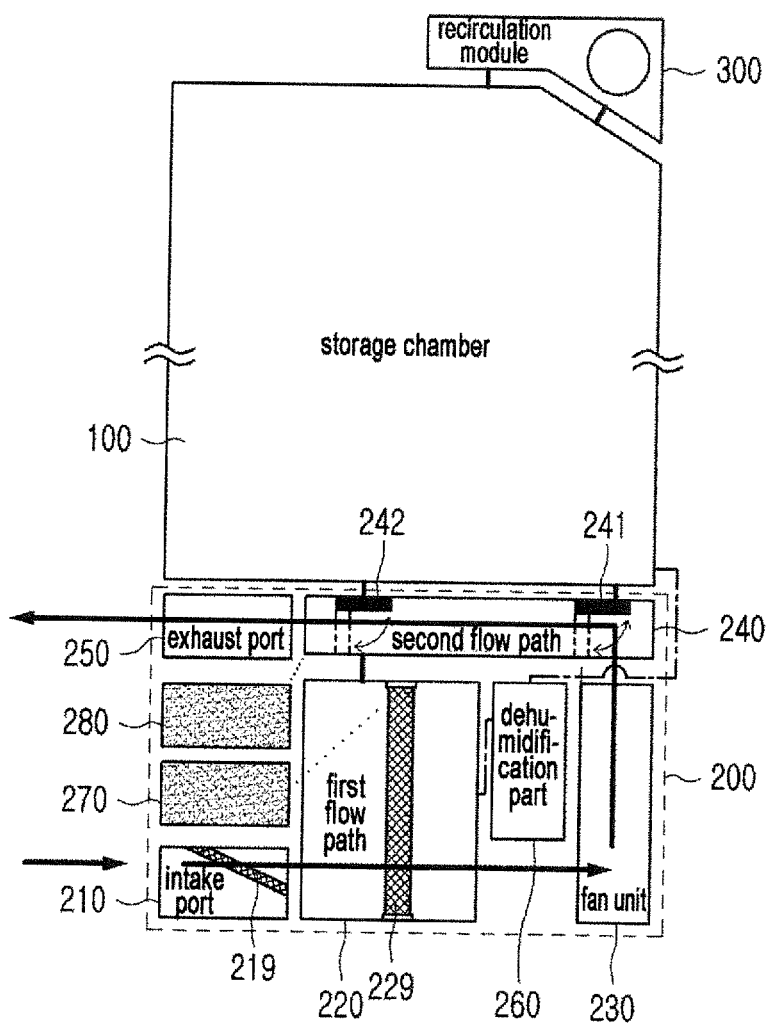
FIG. 7 is a schematic diagram for explaining an air purifying mode of a multifunctional storage system according to the present invention.

The operation modes of the multifunctional storage system according to the present invention will be described with reference to FIGS. 5 to 7.

First, the 'clothing management mode' will be described with reference to FIG. 6.

The clothing management mode is for removing contaminants or odorous substances from the clothing located inside the storage chamber 100. By circulating the natural humidifying air as the circulating air, the inside of the storage chamber 100 may have a wet environment, such that contaminants or odorous substances may be removed from the clothing together with humid air, and the contaminants or odorous substances may be introduced into the machinery chamber 200 and exhausted in the form of the condensate water. In this process, the dehumidification part 260 may dehumidify the circulating air flowing through the storage chamber 100. Alternatively, the inside of the storage chamber 100 may be heated using heat generated from the dehumidification part 260.

When the user selects the clothing management mode, the exhaust door 650 of the door 600 may be closed and the intake port 210 may also be closed. That is, the air in the storage chamber 100 may not be substantially exhausted to the outside in the clothing management mode.

The dehumidification part 260 may dehumidify the circulating air flowing through the storage chamber 100. Alternatively, the heat generated in this process may heat the inside of the storage chamber 100, and the temperature may be in the range of 50° C. to 70° C., but the present invention is not limited thereto. The first flow path switching member 241 and the second flow path switching member 242 of the machinery chamber 200 may operate to allow the second flow path 240 to communicate with the storage chamber 100 and the first flow path 220, and to be blocked from the exhaust port 250. The water of the supply water tank 270 may be supplied to the humidification filter so that the humidification filter provided in the circulation filter unit 229 may contain moisture. In this process, the humidification filter or the water supplied to the humidification filter may be heated by the heat generated from the dehumidification part 260 or a separate heating member (not shown).

Upon or after the dehumidification process, the fan unit 230 may operate. As the fan unit 230 operates, the air inside the storage chamber 100 may flow into the second flow path 240 through the circulating air outlet 142, and then flow again into the first flow path 220 toward the fan unit 230. In this process, the air may be converted into the natural humidifying air by passing through the humidification filter of the circulation filter unit 229. Then, the natural humidifying air may be supplied to the storage chamber 100 by passing through the second flow path 240 and the circulating air inlet 141.

As the above process is repeated, the circulating air may be continuously circulated between the storage chamber 100 and the machinery chamber 200. The circulating air may contain the contaminants or odorous substances in the storage chamber 100, but may not exhaust the contaminants or odorous substances to the outside, thereby providing a comfortable environment for the user. At the same time, once the circulating air containing the contaminants or odorous substances enters the machinery chamber 200, the circulating air is filtered by the circulation filter unit 229, condensed as the condensate water, and collected separately in the condensate water tank 280. Thus, it is very advantageous because recontamination, which is caused by the substance or odorous substance supplied again into the storage chamber 100, may not occur.

Meanwhile, in the clothing management mode, the warm air may be generated by the fan unit 230, the dehumidification part 260 or a separate heating member (not shown) and the warm air may be exhausted to the storage chamber 100. In this case, the natural humidifying air may be primarily exhausted to the storage chamber 100 and then the warm air 100 may be exhausted to the storage chamber 100 after the natural humidifying air has been exhausted.

The recirculation module 300 may assist the circulation of the circulating air. Since the recirculation module 300 recirculates the circulating air at the upper portion of the storage chamber 100, convection may be more smoothly performed throughout the storage chamber 100.

According to another embodiment of the present invention, it is possible to implement only the dust brush function for the clothing stored in the storage chamber 100 by operating only the recirculation module 300 without operating the mechanism inside the machinery chamber 200.

Next, the 'air purifying mode' will be described with reference to FIG. 7.

The air purifying mode is for performing the function of purifying the outside air by operating only the machinery chamber 200 independently from the storage chamber 100. That is, since clean clothing and the like may be located inside the storage chamber 100 in a state where the outside air is contaminated, the outside air may not be introduced into the storage chamber 100 in the air purifying mode.

When the user selects the air purifying mode, the exhaust door 650 of the door 600 may be opened and the intake port 210 may also be opened.

Then, the first flow path switching member 241 and the second flow path switching member 242 of the machinery chamber 200 may operate to allow the second flow path 240 to communicate with the exhaust port 250 and to be blocked from the storage chamber 100 and the first flow path 220. In this process, the storage chamber 100 may become an independent space from the machinery chamber 200.

Then, the fan unit 230 may operate. As the fan unit 230 operate, the outside air may flow into the first flow path 220 through the intake port 210 toward the fan unit 230. While passing through the intake port 210, the outside air may be filtered by the purification filter unit 219 located in the intake port 210. In addition, the outside air may be further filtered by the circulation filter unit 229 located in the first flow path 220 while passing through the first flow path 220. In this case, the humidification filter located in the circulation filter unit 229 may or may not perform the humidification function according to the user's selection. If the outside air is humidified, the supply water tank 270 may supply the water to the humidification filter similarly to the clothing management mode. The filtered outside air passing through the fan unit 230 may be exhausted to the outside through the exhaust port 250 by passing through the second flow path 240.

As the above process is repeated, the multifunctional storage system according to the present invention may perform the function of an air purifier. The outside air may be continuously introduced into the machinery chamber 200 and filtered, and the filtered air may be continuously exhausted.

It is advantageous because the air purifying mode may be performed regardless of whether the user opens the door 600. Even during the air purifying mode, the user may freely open the door 600 to place the clothing or the like inside the storage chamber 100 or to take out the clothing or the like. At any time, the supply water tank 270 may be filled with water and the water in the condensate water tank 280 may be exhausted. Since the door 600 may not cover the intake port 210 and the exhaust port 250 may be opened inside the door 600, the opening of the door 600 does not affect the operation of the air purifying mode.

The user can confirm whether the current operation mode is the air purifying mode or the clothing management mode from a location far away from the multifunctional storage system, that is, from a location where the controller 610 is rarely visible, by checking only the opening state of the exhaust door 650.

Even when the filter is contaminated due to the continuous operation of the air purifying mode or the clothing management mode, the user can easily replace the filter. In the case of the purification filter unit 219, the filter may be replaced by inserting a hand into the intake port 210 located below the door 600. In the case of the circulation filter unit 229, the filter may be replaced by opening the door 600 and manipulating the circulation filter mounting part 129.

Meanwhile, another embodiment of the multifunctional storage system of the present invention may further include a full circulation mode and a full blocking mode in addition to the clothing management mode and the air purifying mode described above.

First, the full circulation mode is for allowing the purification filter unit 219 provided in the machinery chamber 200 to communicate with the storage chamber 100 as well as the outside air of the multifunctional storage system. The air inside the storage chamber 100 may be introduced into the purification filter unit 219 and filtered, and the outside air of the multifunctional storage system may also be introduced and filtered. The above circulation mode may be advantageous when it is necessary to rapidly circulate and purify the air under the condition that the quality of indoor air (that is, the outside air) and the air inside the storage chamber 100 is not too poor.

On the contrary to the full circulation mode, the full blocking mode is for allowing the machinery chamber 200 to be blocked from the storage chamber 100 as well as the outside air of the multifunctional storage system. For example, it is advantageous when the performance of the purification filter unit 219 is degraded so that it is needed to replace the purification filter unit 219, when it is not particularly required to filter the inside of the storage chamber 100 and the inside air, and when only the preheating of the machinery chamber 200 is necessary.

Although the present invention has been described with reference to the embodiments shown in the drawings such that those skilled in the art can easily understand and reproduce the present invention, the embodiments are illustrative purposes only, and those skilled in the art may understand that various modifications and equivalents are possible from the embodiments of the present invention. Therefore, the protection scope of the present invention will be defined by the claims.

DESCRIPTION OF REFERENCE NUMERALS

100: storage chamber
129: circulation filter mounting part
130: recirculation module mounting part
141: circulating air inlet
142: circulating air outlet
147: functional material storage part
200: machinery chamber
210: intake vent
218: purification filter unit mounting part
219: purification filter unit
220: first flow path
229: circulation filter unit
230: fan unit
240: second flow path
241: first flow path switching member
242: second flow path switching member
250: exhaust port
260: dehumidification part
270: supply water tank
280: condensate water tank
300: recirculation module
500: casing
600: door
610: controller
650: exhaust door

The invention claimed is:

1. A multifunctional storage system, comprising:
a storage chamber;
a machinery chamber provided at a side of the storage chamber;
a dehumidification device configured to dehumidify circulating air flowing in the storage chamber;
a circulating air inlet and a circulating air outlet configured to allow the storage chamber and the machinery chamber to communicate with each other;
a first flow path switching member moving between a first position, in which the circulating air inlet is opened in the machinery chamber so that the storage chamber and the machinery chamber communicate with each other, and a second position, in which the circulating air inlet is closed to block communication between the storage chamber and the machinery chamber; and a second flow path switching member moving between a third position, in which the circulating air outlet is opened in the machinery chamber so that the storage chamber and the machinery chamber communicate with each other, and a fourth position, in which the circulating air outlet is closed to block communication between the storage chamber and the machinery chamber;

wherein the machinery chamber further comprises:

an intake port and an exhaust port configured to allow outside air to communicate with the machinery chamber; and a purification filter unit configured to filter the outside air introduced through the intake port.

2. The multifunctional storage system of claim 1, wherein the storage chamber is heated by the dehumidification device.

3. The multifunctional storage system of claim 1, wherein the machinery chamber further comprises:

a fan unit configured to circulate outside air or circulating air in one direction;

a first flow path configured to allow the intake port and the fan unit to communicate with each other; and a second flow path configured to communicate with each of the exhaust port, the fan unit, the first flow path, and the storage chamber.

4. The multifunctional storage system of claim 3, wherein the first and second flow path switching members allow the second flow path to selectively communicate with the exhaust port or the storage chamber.

5. The multifunctional storage system of claim 3, wherein the machinery chamber further comprises:

a supply water tank;

a condensate water tank; and a circulation filter unit configured to supply moisture to the circulating air supplied to the storage chamber via the circulating air inlet, wherein the circulation filter unit is provided on the first flow path, the circulation filter unit receives moisture from the supply water tank, and condensate water generated from the circulating air of the storage chamber and the machinery chamber is stored in the condensate water tank.

6. The multifunctional storage system of claim 3, wherein the second flow path is located above the fan unit and the first flow path.

7. The multifunctional storage system of claim 3, wherein the circulating air inlet and the circulating air outlet are located between the second flow path and the storage chamber, the circulating air inlet is configured to communicate with the fan unit such that the circulating air is exhausted from the machinery chamber toward the storage chamber, and the circulating air outlet is configured to circulate the circulating air from the storage chamber toward the machinery chamber.

8. The multifunctional storage system of claim 7, wherein a portion in communication with the circulating air inlet in the storage chamber is inclined upward, so that the circulating air introduced from the circulating air inlet is exhausted into the storage chamber while forming a predetermined angle from a bottom surface of an inside of the storage chamber.

9. The multifunctional storage system of claim 3, wherein in a clothing management mode where the dehumidification device operates, natural humidifying air generated by the circulation filter unit is supplied to the storage chamber and circulated therein in a state in which the machinery chamber is blocked from the outside air and communicates with the storage chamber.

10. The multifunctional storage system of claim 9, wherein, in the clothing management mode, the circulating air inlet and the circulating air outlet are opened, and the intake port and the exhaust port are closed.

11. The multifunctional storage system of claim 9, wherein the natural humidifying air is supplied to the storage chamber by the fan unit and circulated therein.

12. The multifunctional storage system of claim 9, wherein, in the clothing management mode, the circulating air that flows by the fan unit circulates through the machinery chamber and the storage chamber while sequentially flowing through the second flow path, the circulating air inlet, the storage chamber, the circulating air outlet, the second flow path, the first flow path and the fan unit.

13. The multifunctional storage system of claim 9, wherein, in the clothing management mode, warm air is generated by heat generated from the fan unit and the dehumidification device and is exhausted to the storage chamber.

14. The multifunctional storage system of claim 13, wherein, in the clothing management mode, the natural humidifying air is primarily exhausted to the storage chamber and the warm air is exhausted to the storage chamber after the exhaust of the natural humidifying air is stopped.

15. The multifunctional storage system of claim 3, wherein, in an air purifying mode for filtering the outside air, the machinery chamber is blocked from the storage chamber and communicates with the outside air so that the outside air filtered by the purification filter unit is exhausted to an outside.

16. The multifunctional storage system of claim 15, wherein, in the air purifying mode, the circulating air inlet and the circulating air outlet are closed, and the intake port and the exhaust port are opened.

17. The multifunctional storage system of claim 16, wherein, in the air purifying mode, the outside air introduced through the intake port sequentially flows through the purification filter unit, the first flow path, the fan unit, the second flow path and the exhaust port.

18. The multifunctional storage system of claim 1, further comprising:

a door configured to cover front surfaces of the machinery chamber and the storage chamber except for the intake port, wherein the door includes a controller and an exhaust door configured to open and close the exhaust port, the exhaust door being opened in an air purifying mode and closed in a clothing management mode.

19. The multifunctional storage system of claim 1, wherein a recirculation module comprising a recirculation fan is provided at an upper end of the storage chamber, and the recirculation module exhausts the circulating air toward a lower portion of an inside of the storage chamber.

20. The multifunctional storage system of claim 1, wherein the system has a full circulation mode and a full blocking mode, wherein the system is in the full circulation mode, the machinery chamber communicates with both the outside air and the storage chamber, and wherein the system is in the full blocking mode, the machinery chamber is blocked from both the outside air and the storage chamber.

\* \* \* \* \*